United States Patent
Nishimura et al.

(10) Patent No.: US 11,060,761 B2
(45) Date of Patent: Jul. 13, 2021

(54) PLATE HEAT EXCHANGER AND WATER HEATER INCLUDING SAME

(71) Applicant: NORITZ CORPORATION, Hyogo (JP)

(72) Inventors: Kazuhiro Nishimura, Kobe (JP); Shigeo Sugie, Kobe (JP); Kenichi Nakayama, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 16/654,101

(22) Filed: Oct. 16, 2019

(65) Prior Publication Data
US 2020/0132397 A1  Apr. 30, 2020

(30) Foreign Application Priority Data
Oct. 29, 2018  (JP) .............................. JP2018-202687

(51) Int. Cl.
*F24H 9/00* (2006.01)
*F28D 9/00* (2006.01)
*F24H 1/38* (2006.01)

(52) U.S. Cl.
CPC ............. *F24H 9/0005* (2013.01); *F24H 1/38* (2013.01); *F28D 9/0043* (2013.01); *F28D 9/0062* (2013.01)

(58) Field of Classification Search
CPC ........ F24H 9/0005; F24H 1/38; F28D 9/0043; F28D 9/0062; F28D 9/02
See application file for complete search history.

(56) References Cited

U.S. PATENT DOCUMENTS

| 8,646,442 | B2 * | 2/2014 | Manohar | F28D 9/0031 126/112 |
| 9,404,691 | B2 * | 8/2016 | Kaupp | F28D 1/0391 |
| 10,598,405 | B2 * | 3/2020 | Jeong | F24H 1/34 |
| 10,605,484 | B2 * | 3/2020 | Kim | F24D 17/0078 |
| 2009/0288813 | A1 * | 11/2009 | Park | F23J 15/06 165/169 |

FOREIGN PATENT DOCUMENTS

| EP | 498748 A1 * | 8/1992 |
| JP | 3054888 U | 12/1998 |
| JP | 4813288 B2 | 11/2011 |

* cited by examiner

Primary Examiner — Devon Russell
(74) Attorney, Agent, or Firm — Studebaker & Brackett PC

(57) ABSTRACT

A plate heat exchanger includes a plurality of plates stacked so that a liquid flow passage is formed on the inside thereof, and a gas flow passage through which heating gas passes, the gas flow passage being formed between the plurality of plates and including a gas inflow opening portion and a gas outflow opening portion positioned on an opposite side to the gas inflow opening portion, wherein the gas outflow opening portion has a smaller opening area than the gas inflow opening portion. Thus, when the heating gas passes through the gas flow passage, even if the volumetric flow thereof decreases due to a reduction in temperature or condensation, a reduction in the flow velocity of the heating gas can be suppressed. Hence, a reduction in a heat transfer coefficient can be suppressed, leading to an improvement in heat transfer efficiency, and as a result, reductions in overall size, weight, and manufacturing cost can be achieved appropriately.

10 Claims, 8 Drawing Sheets

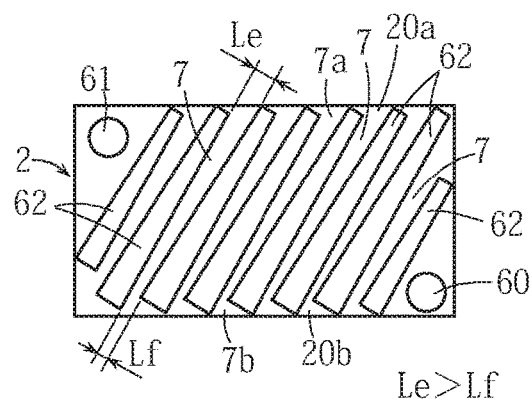
FIG.10
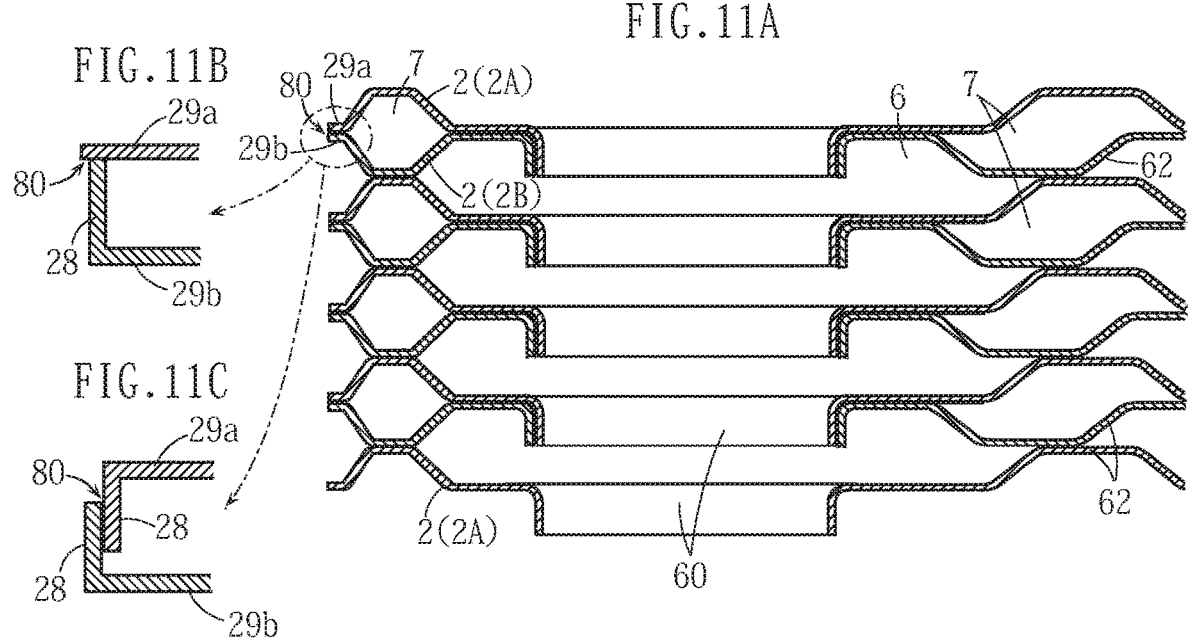
FIG.11A
FIG.11B
FIG.11C

PLATE HEAT EXCHANGER AND WATER HEATER INCLUDING SAME

BACKGROUND OF THE INVENTION

Field of the Invention

The present invention relates to a gas-liquid plate heat exchanger and a water heater including the plate heat exchanger.

Description of the Related Art

The inventions described in Japanese Patent No. 4813288 and Japanese Utility Model Registration No. 3054888 are available as specific examples of plate heat exchangers.

The plate heat exchangers described in these documents each have a plurality of plates stacked such that a liquid flow passage is formed in the inside thereof. A gas flow passage through which heating gas such as combustion gas flows is formed between the plurality of plates.

According to this configuration, by passing water, for example, through the liquid flow passage and passing the heating gas through the gas flow passage, the water can be heated, and as a result, hot water can be generated.

In the above prior art, however, there remains room for improvement, as will be described below.

When heating gas such as combustion gas passes through the gas flow passage of the plate heat exchanger, the temperature of the heating gas decreases gradually toward the downstream side, and as a result, the heating gas condenses, leading to a reduction in the volumetric flow thereof. Accordingly, the flow velocity of the heating gas decreases, leading to a reduction in a heat transfer coefficient between the heating gas and the plates. Therefore, the heat exchange efficiency cannot be improved sufficiently, and there remains room for improvement in terms of promoting reductions in the size, weight, and manufacturing cost of the plate heat exchanger, and so on.

CITATION LIST

Patent Literature 1: Japanese Patent No. 4813288
Patent Literature 2: Japanese Utility Model Registration No. 3054888

SUMMARY OF THE INVENTION

An object of the present invention is to provide a plate heat exchanger with which problems such as those described above can be eliminated appropriately, and a water heater including the plate heat exchanger.

To solve the problems described above, the present invention employs the following technical means.

A plate heat exchanger provided by a first aspect of the present invention includes a plurality of plates stacked so that a liquid flow passage is formed on the inside thereof, and a gas flow passage through which heating gas passes, the gas flow passage being formed between the plurality of plates and including a gas inflow opening portion and a gas outflow opening portion positioned on an opposite side to the gas inflow opening portion, wherein the gas outflow opening portion has a smaller opening area than the gas inflow opening portion.

Preferably, each of the plates has a smaller width on the gas outflow opening portion side than the gas inflow opening portion side.

Preferably, each of the plates is provided in an upright attitude in an up-down height direction, and an inflow port of the liquid flow passage is provided in a lower portion of each of the plates on the side of a first end portion in a width direction, while an outflow port of the liquid flow passage is provided in an upper portion of each of the plates on the side of a second end portion opposing the first end portion in the width direction.

Preferably, an upper end portion of each of the plates is inclined so that the second end portion has a greater height than the first end portion.

Preferably, an upper end portion and a lower end portion of each of the plates are positioned respectively on an upstream side and a downstream side in a heating gas flow direction, and the liquid flow passage includes a first region that surrounds the inflow port when seen from the front, and a first flow passage that extends linearly from the first region toward the upper end portion of the plate.

Preferably, the liquid flow passage includes a second region that surrounds the outflow port when seen from the front, and a second flow passage that extends linearly from the second region toward a lower end portion of the plate.

Preferably, outer peripheral end portions of the plurality of plates, which oppose each other on opposite sides of the gas flow passage, are bonded to each other except in regions of the gas inflow opening portion and the gas outflow opening portion.

Preferably, adjacent plates, among the plurality of plates, are brazed to each other, whereas regions near the center of plates that oppose each other on opposite sides of the gas flow passage are not brazed and therefore remain in a non-bonded state.

The plate heat exchanger according to the present invention preferably further includes a flow-straightening member that covers a region of the outer periphery of the plurality of plates excluding the gas inflow opening portion and the gas outflow opening portion and prescribes respective opening widths of the gas inflow opening portion and the gas outflow opening portion.

Preferably, a plurality of gas flow passages are provided as the gas flow passage, and the gas outflow opening portion of each of the gas flow passages has a narrower width than the gas inflow opening portion.

A water heater provided by a second aspect of the present invention includes the plate heat exchanger provided by the first aspect of the present invention.

The water heater according to the present invention preferably further includes an exhaust gas guide member that is connected to a downstream side of the plate heat exchanger in a heating gas flow direction in order to cause heating gas that has passed through the plate heat exchanger to flow in a first direction intersecting the heating gas flow direction through the plate heat exchanger, wherein the plate heat exchanger is set so that a stacking direction of the plurality of plates corresponds to a second direction that intersects the first direction.

Other features and advantages of the present invention will become more apparent from the embodiment of the invention to be described below with reference to the attached figures.

BRIEF DESCRIPTION OF THE DRAWINGS

FIG. 10 is a schematic front view showing another example of a plate in pattern form;

FIG. 11A is a sectional view showing main parts of the heat exchanger shown in FIG. 2, and FIGS. 11B and 11C are enlarged sectional views showing main parts of other examples;

DETAILED DESCRIPTION OF THE PREFERRED EMBODIMENTS

Preferred embodiments of the present invention will be described specifically below with reference to the figures.

Figure 1:
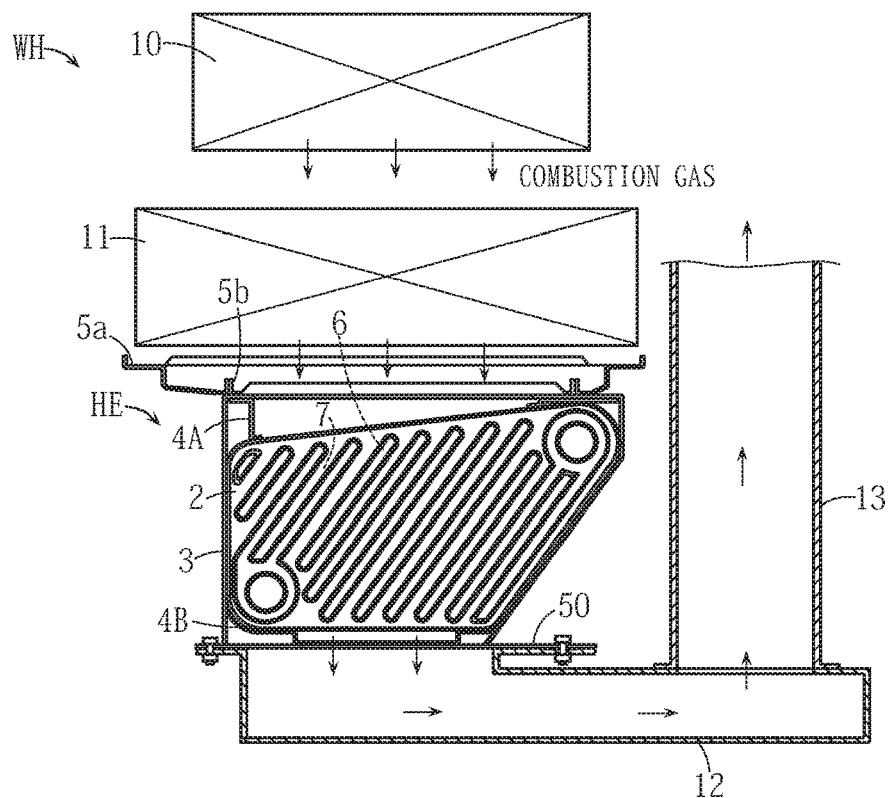
FIG. 1 is a schematic illustrative sectional view showing main parts of an example of a water heater according to the present invention.
Figure 2:
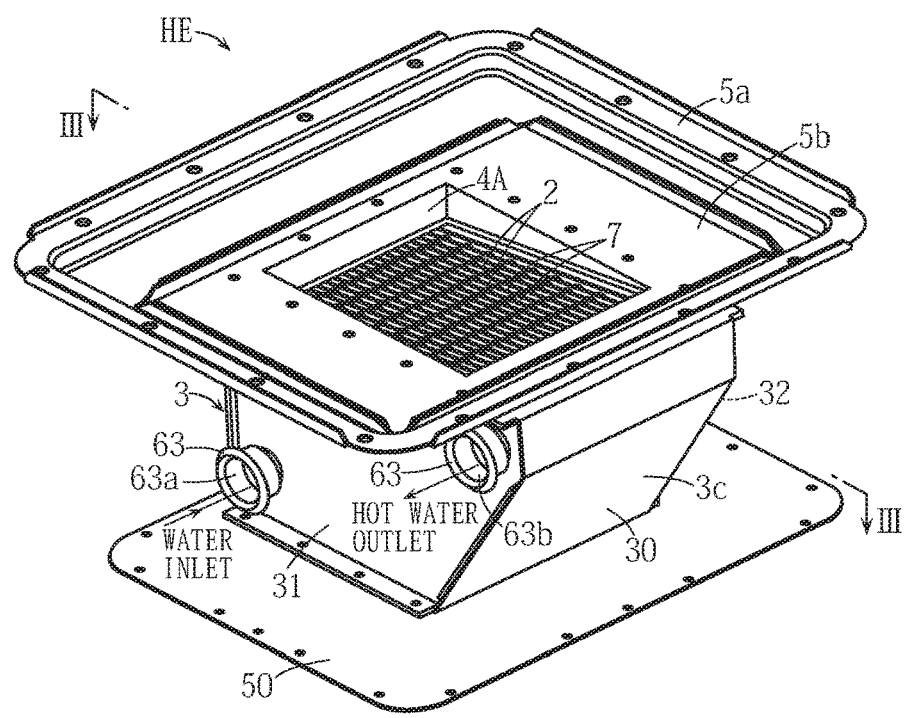
FIG. 2 is a schematic perspective view showing a heat exchanger used as a secondary heat exchanger of the water heater shown in FIG. 1.

A water heater WH shown in FIG. 1 is configured as a hot water supply device employing a plate heat exchanger HE. A burner 10 and another heat exchanger 11 are provided on the upper side of the plate heat exchanger HE. The other heat exchanger 11 is a primary heat exchanger used for recovering sensible heat, while the plate heat exchanger HE according to this embodiment corresponds to a secondary heat exchanger used for recovering latent heat. In the water heater WH, combustion gas serving as heating gas generated by the burner 10 advances downward so as to pass through the heat exchangers 11, HE in that order, whereby sensible heat and latent heat are recovered successively from the combustion gas, and using the recovered heat, water to be heated is heated. An exhaust manifold 12 and an exhaust duct 13 are provided at a latter stage of the plate heat exchanger HE as an exhaust gas guide member. The combustion gas, after passing through the plate heat exchanger HE, is discharged to the outside through the exhaust manifold 12 and the exhaust duct 13.

In FIGS. 2 to 4B, the plate heat exchanger HE includes a plurality of plates 2, a case 3 housing the plurality of plates 2 in the interior thereof, upper side and lower side flow-straightening members 4A, 4B disposed in the case 3, upper side receiving members 5a, 5b attached to the upper side of the case 3 and used to connect the plate heat exchanger HE to the other heat exchanger 11, and a base member 50 attached to the lower side of the case 3 and used to connect the plate heat exchanger HE to the exhaust manifold 12.

The plurality of plates 2 are made of metal and stacked in a front-rear horizontal direction (an orthogonal direction to the paper surface in FIG. 3) in an upright attitude in an up-down height direction. As shown in FIGS. 4A and 4B, a plurality of first and second plates 2A, 2B and a third plate 2C disposed in a backmost surface portion are provided as the plurality of plates 2. The first and second plates 2A, 2B are arranged alternately, one at a time, so that a liquid flow passage 6 and a gas flow passage 7 are formed therebetween.

Figure 5A:
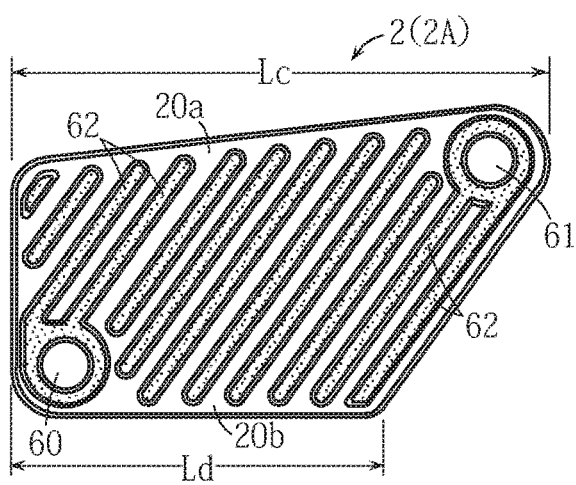
FIG. 5A is a front view of a first plate of the heat exchanger shown in FIG. 2.
Figure 5B:
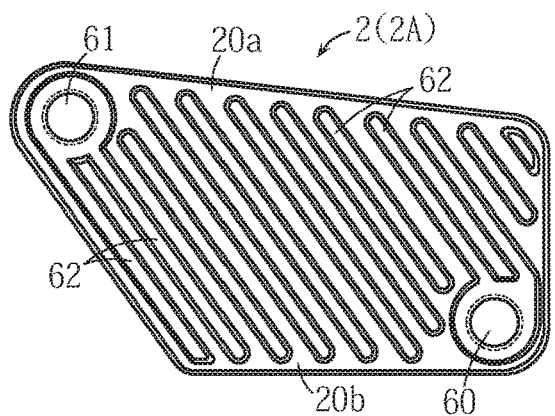
FIG. 5B is a back view thereof.
Figure 5C:
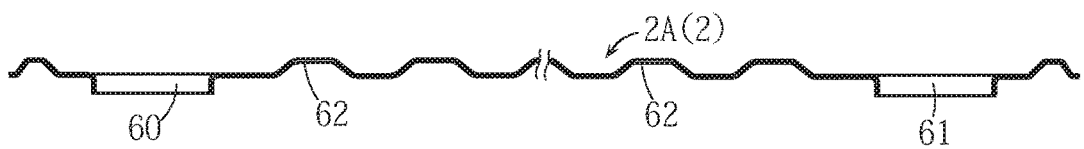
FIG. 5C is a sectional view of FIG. 5A.
Figure 6A:
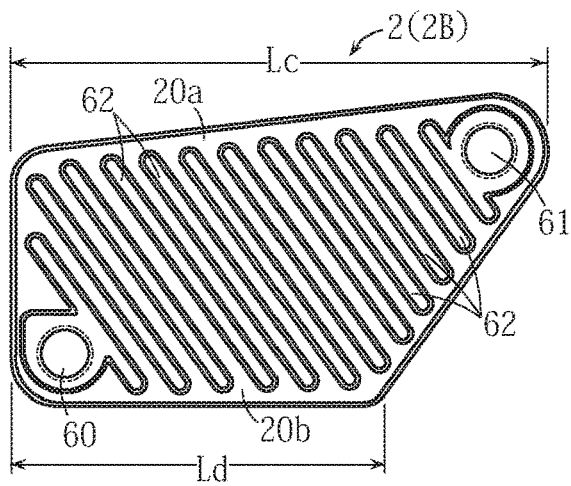
FIG. 6A is a front view of a second plate of the heat exchanger shown in FIG. 2.
Figure 6B:
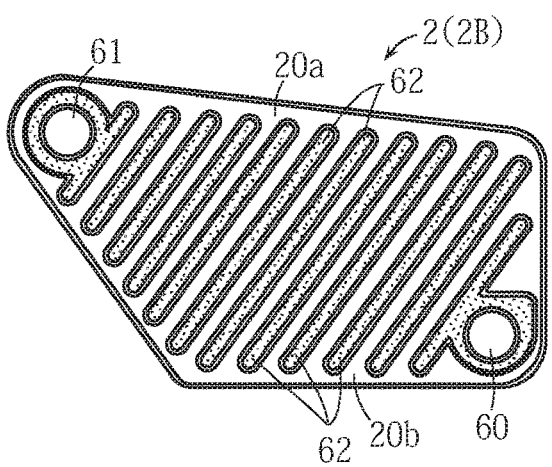
FIG. 6B is a back view thereof.
Figure 6C:
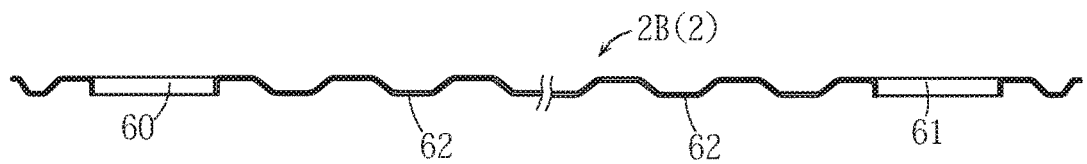
FIG. 6C is a sectional view of FIG. 6A.

More specifically, the first and second plates 2A, 2B are formed as shown in FIGS. 5A to 6C so as to each include an inflow port 60 and an outflow port 61, which are constituted by burring holes for water to be heated (liquid), and a plurality of step-press portions 62 having a rib shape when seen from the front. In FIGS. 5A and 6B, parts of the plurality of step-press portions 62 shaded with a dot pattern are parts where the front side forms a recessed portion and the opposite surface side thereto forms a projecting portion. The step-press portions 62 of the first and second plates 2A, 2B are inclined in respectively different directions.

The liquid flow passage 6 shown in FIGS. 4A and 4B is a site formed by stacking the plurality of first and second plates 2A, 2B alternately so that the recessed portions of the step-press portions 62 intersect and communicate with each other. The liquid flow passage 6 is formed on the inside of the first and second plates 2A, 2B and connected from the inflow port 60 to the outflow port 61. The inflow port 60 and the outflow port 61 of the plate 2 on the frontmost surface respectively form a water inlet 63a and a hot water outlet 63b to which pipe joint members 63 are attached. Water to be heated, which is supplied to the water inlet 63a, bifurcates successively into and advances through the liquid flow passage 6 formed between the plurality of plates 2, reaches the plurality of outflow ports 61 after passing through the liquid flow passage 6, converges therein, and then reaches the hot water outlet 63b. The third plate 2C is used to cause water to be heated that has advanced to the backmost surface portion to perform a U turn. During the flow process described above, the water to be heated is heated by combustion gas passing through the gas flow passage 7. The gas flow passage 7 is a region other than the liquid flow passage 6 in the gap region formed between the first and second plates 2A, 2B.

Figure 3:
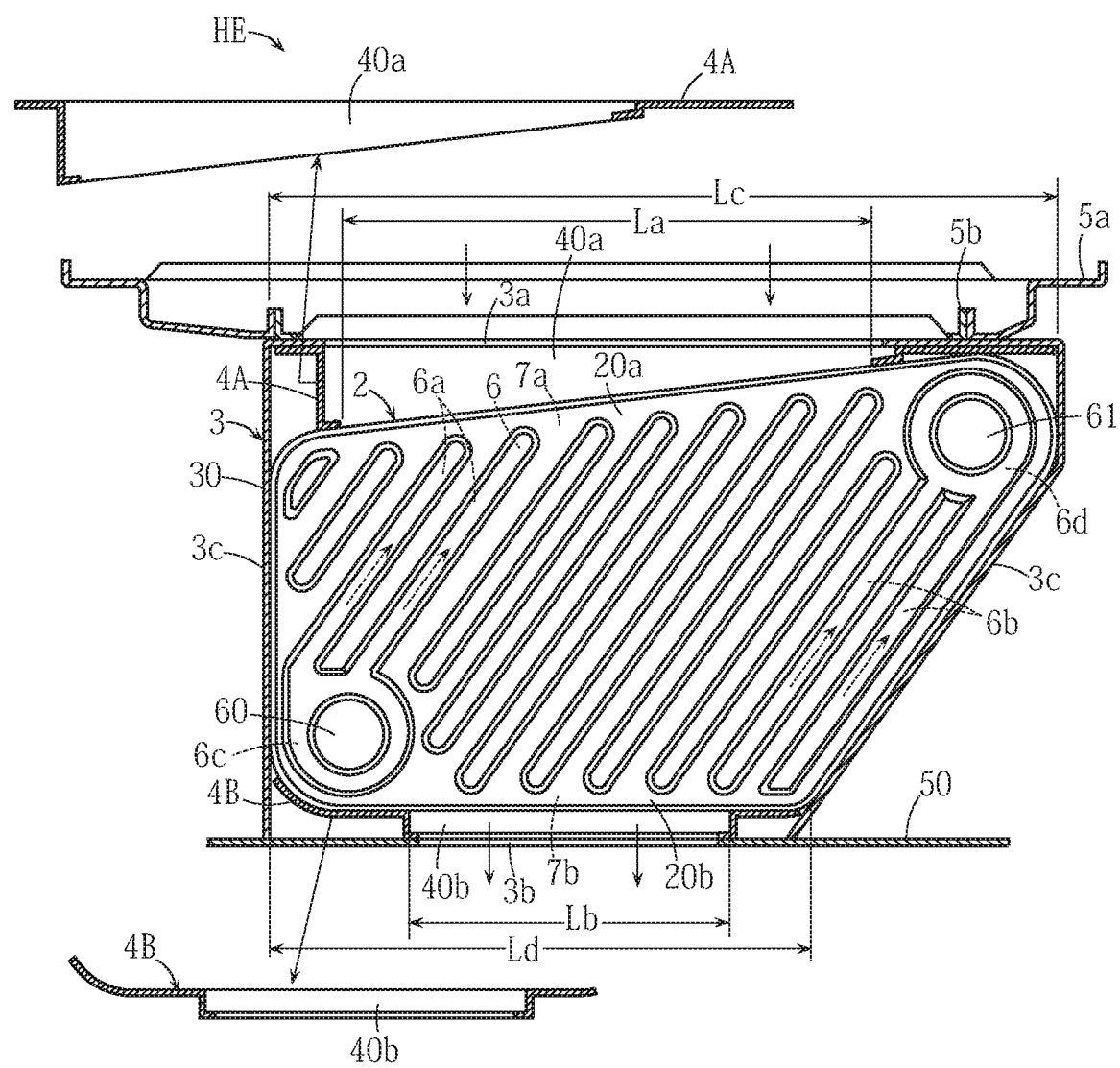
FIG. 3 is a sectional view of FIG. 2.
Figure 4A:
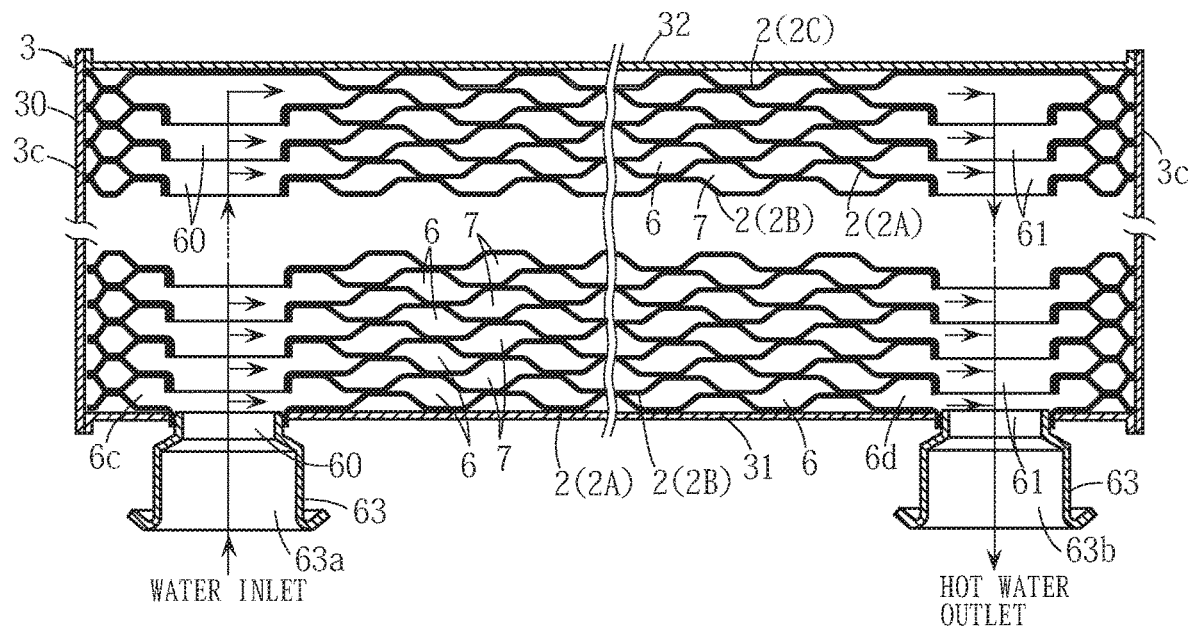
FIG. 4A is a planar sectional view of FIG. 3.
Figure 4B:
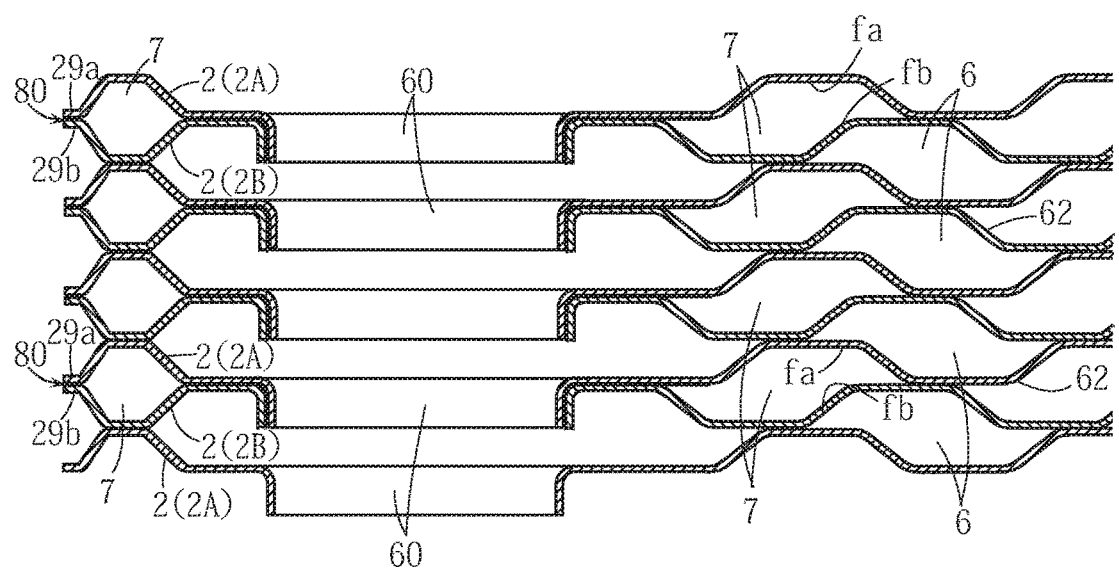
FIG. 4B is an enlarged sectional view of the main parts of FIG. 4A.

In FIG. 3, the gas flow passage 7 includes an upper side gas inflow opening portion 7a and a lower side gas outflow opening portion 7b. Respective widths La, Lb thereof have a relationship of La>Lb so that the gas outflow opening portion 7b has a smaller opening area than the gas inflow opening portion 7a. As will be described below, this configuration brings about effects for suppressing a reduction in the flow velocity of the heating gas and preventing a large reduction in a heat transfer coefficient of the plate heat exchanger HE.

The upper side and lower side flow-straightening members 4A, 4B are members respectively having opening portions 40a, 40b corresponding to the gas inflow opening portion 7a and the gas outflow opening portion 7b. By employing the flow-straightening members 4A, 4B, the widths La, Lb of the gas inflow opening portion 7a and the gas outflow opening portion 7b are set in the aforesaid relationship. In accordance with this configuration, a width Ld of a lower end portion 20b of each plate 2 is shorter than a width Lc of an upper end portion 20a.

The case 3 is formed by combining a case main body portion 30, a front plate portion 31, and a rear plate portion 32 (see FIG. 4A). As shown in FIG. 3, the case main body portion 30 is a member in which opening portions 3a, 3b through which the combustion gas passes are formed respectively in an upper portion and a lower portion thereof, and side wall portions 3c thereof contact and are bonded to outside edge portions of the plurality of plates 2.

Each of the plates 2 is configured such that the inflow port 60 is provided in a lower portion on one width direction end (a first end portion) side, and the outflow portion 61 is provided in an upper portion on the other width direction end (a second end portion) side. The upper end portion 20a of each plate 2 is inclined so as to increase in height steadily toward the outflow portion 61. This configuration brings about an action for promoting the discharge of air bubbles, as will be described below.

The gas flow passage 6 includes first and second regions 6c, 6d and first and second flow passages 6a, 6b. The first and second regions 6c, 6d, when seen from the front, are substantially circular regions respectively surrounding the inflow port 60 and the outflow port 61. The first flow passage 6a extends linearly from the first region 6c toward the upper end portion 20a of the plate 2. The second flow passage 6b extends linearly from the vicinity of the lower end portion 20b of the plate 2 toward the outflow port 61. As will be described below, this configuration brings about actions for improving the heat exchange efficiency and promoting the discharge of air bubbles.

Adjacent first and second plates 2A, 2B are brazed to each other. In principle, this brazing is performed on the parts of the first and second plates 2A, 2B that contact each other. Note, however, that in this embodiment, regions of the first and second plates 2A, 2B near the center of surfaces (surfaces indicated by reference symbols fa and fb in FIG. 4B) that oppose each other on opposite sides of the gas flow passage 7 are not brazed and therefore remain in a non-bonded state.

Figure 7:
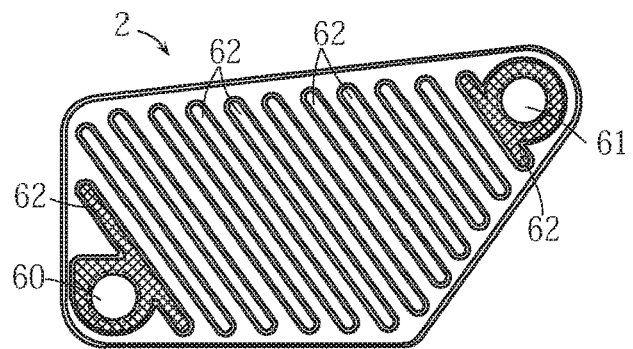
FIG. 7 is an illustrative view showing brazing of the plates provided in the heat exchanger shown in FIG. 2.

More specifically, in FIG. 7, on the plate 2, the parts on the periphery of the inflow port 60 and the outflow port 61 and the small number of step-press portions 62 nearby are set as brazed regions (shaded parts). The step-press portions 62 in the region near the center of the plate 2, on the other hand, are not set as brazed regions.

Bonded portions 80 (brazed portions) between outer peripheral end portions 29a, 29b of the first and second plates 2A, 2B are provided in regions on the outer peripheral edges of the first and second plates 2A, 2B excluding the gas inflow opening portion 7a and the gas outflow opening portion 7b (see FIG. 4B). Regions on the inside of the bonded portions 80 form parts of the gas flow passage 7.

As illustrated in FIG. 1, in the plate heat exchanger HE, the combustion gas advances downward. Having passed through the plate heat exchanger HE, meanwhile, the combustion gas flows through the exhaust manifold 12 in a rightward direction (a first direction) in the figure. In accordance with this configuration, the plurality of plates 2 are stacked in a second direction (in this embodiment, a front-rear direction of the water heater WH) that intersects the first direction. As will be described below, this is favorable for improving the heat exchange efficiency.

Next, actions of the plate heat exchanger HE and the water heater WH including the plate heat exchanger HE will be described.

First, the combustion gas, while passing through the gas flow passage 7 of the plate heat exchanger HE, steadily decreases in temperature as the gas advances toward the downstream side. Accordingly, the combustion gas condenses, leading to a reduction in the volume thereof. Hence, under ordinary circumstances, the flow velocity of the combustion gas decreases, leading to a reduction in the heat transfer coefficient between the combustion gas and the plates 2. According to this embodiment, however, the gas outflow opening portion 7b has a smaller opening area than the gas inflow opening portion 7a, and therefore a reduction in the flow velocity of the combustion gas is suppressed. Accordingly, a reduction in the heat transfer coefficient is also suppressed, and as a result, favorable heat transfer efficiency can be achieved.

The gas outflow opening portion 7b on the lower side of the gas flow passage 7 has a narrower width than the gas inflow opening portion 7a on the upper side. In accordance with this configuration, the width Ld of the lower end portion 20b of each plate 2 is set to be shorter than the width Lc of the upper end portion 20a. Thus, parts that are of little use during heat exchange are not formed on the plates 2, and the plates 2 can be reduced in size and weight. As described above, in this embodiment, the heat exchange efficiency can be improved by suppressing a reduction in the heat transfer coefficient, and therefore further reductions in the size and weight of the plates 2 can be achieved. As a result, the manufacturing cost of the plate heat exchanger HE can also be reduced.

When water to be heated flows through the liquid flow passage 6, air bubbles may form (become intermixed) inside the liquid flow passage 6. When a large number of air bubbles remain in the liquid flow passage 6, the parts of the plate 2 where the air bubbles remain may not be cooled by the water to be heated, and as a result, heat damage may occur. It is therefore desirable to ensure that this situation does not arise.

However, each plate 2 is in an upright attitude in the up-down height direction so that the inflow port 60 of the liquid flow passage 6 is positioned in the lower portion on the first end portion side and the outflow port 61 is positioned in the upper portion on the second end portion side. Hence, when air bubbles form in the liquid flow passage 6, the air bubbles are more likely to rise and reach the outflow port 61, and as a result, an air bleeding performance can be improved. Moreover, the overall length of the liquid flow passage 6 from the inflow port 60 to the outflow port 61 can be increased, whereby an effect for improving the heat exchange efficiency is obtained.

Furthermore, according to this embodiment, the upper end portion 20a of each plate 2 is inclined, and therefore, when air bubbles rise so as to reach the vicinity of the upper end portion 20a of the plate 2, the air bubbles move along the incline of the upper end portion 20a to the outflow port 61 side. Hence, the air bubbles flow actively toward the outflow port 61, and as a result, a situation in which a large number of air bubbles remain in the liquid flow passage 6 can be prevented from occurring.

The second flow passage 6b of the liquid flow passage 6 exists near the lower end portion 20b of the plate 2 and functions as a flow passage for carrying air bubbles that have become intermixed into the water to be heated vigorously and directly to the second region 6d and the outflow port 61. Thus, the air bubbles can be caused to flow smoothly into the outflow port 61, and as a result, an even more favorable air bleeding performance can be achieved.

The first flow passage 6a, meanwhile, causes the water to be heated flowing into the first region 6c of the liquid flow passage 6 through the inflow port 60 to flow quickly to the vicinity of the upper end portion 20a of the plate 2. Here, the upper end portion 20a of the plate 2 is the part of the plate 2 that is heated to the highest temperature by the combustion gas. Hence, the (comparatively low-temperature) water to be heated flowing into the liquid flow passage 6 through the inflow port 60 can be heated quickly and efficiently. This is favorable for improving the heat exchange efficiency.

The adjacent first and second plates 2A, 2B are brazed to each other. As described above with reference to FIGS. 4B and 7, however, the regions near the centers of the surfaces fa, fb that oppose each other on opposite sides of the gas flow passage 7 are not brazed and therefore remain in a non-bonded state. Thus, brazing material can be saved, leading to a further reduction in manufacturing cost. Moreover, when brazed parts exist in the gas flow passage 7, the heat exchange efficiency decreases, but this problem can also be eliminated. In contrast to the liquid flow passage 6, pressure in the gas flow passage 7 is comparatively low, and therefore a reduction in the amount of brazing in the locations facing the gas flow passage 7 does not cause any particular problems.

As described with reference to FIG. 4B, the first and second plates 2A, 2B include the bonded portions 80 (brazed portions) where the outer peripheral end portions 29a, 29b are bonded to each other, and therefore the gas flow passage 7 is partially sealed. Hence, according to this embodiment, the need to seal the parts of the outer periphery of the first and second plates 2A, 2B other than the gas inflow opening portion 7a and the gas outflow opening portion 7b using a dedicated sealing member can be eliminated. Moreover, by providing the bonded portions 80, the strength with which the first and second plates 2A, 2B are bonded to each other can be increased.

According to this embodiment, as will be described below, the heat exchange efficiency can be improved in comparison with another embodiment shown in FIG. 8. Note that in FIG. 8 and subsequent figures, elements that are identical or similar to those of this embodiment have been allocated identical reference numerals to this embodiment, and duplicate description thereof has been omitted.

Figure 8:
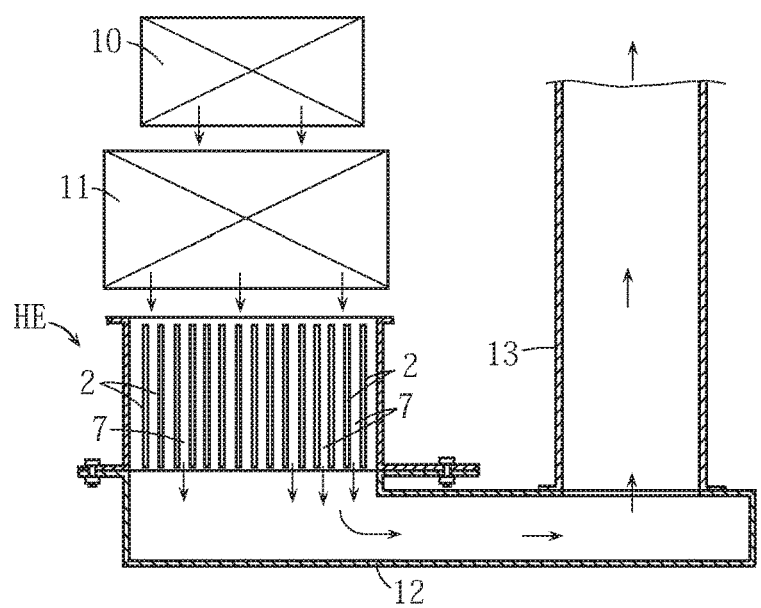
FIG. 8 is a schematic illustrative sectional view showing main parts of another example of the water heater according to the present invention.

In the other embodiment shown in FIG. 8, the stacking direction of the plurality of plates 2 is identical to the direction (the rightward direction) in which the combustion gas flows through the exhaust manifold 12. According to this configuration, when the combustion gas passes through the gas flow passage 7 in the plurality of plates 2, a large amount of combustion gas flows and acts at a bias toward the right-side region of the plurality of plates 2. In this case, the combustion gas does not act on the left-side region of the plates 2, and as a result, there is a risk of the heat exchange efficiency decreasing. In the embodiment shown in FIG. 1, however, the combustion gas acts substantially evenly on each of the plurality of plates 2, and as a result, this risk can be eliminated.

In addition to FIG. 8, FIGS. 9A to 16B show other embodiments of the present invention.

Figure 9A:
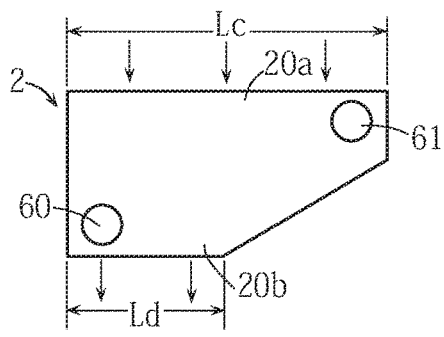
FIGS. 9A and 9B are schematic front views showing other examples of plates in pattern form.
Figure 9B:
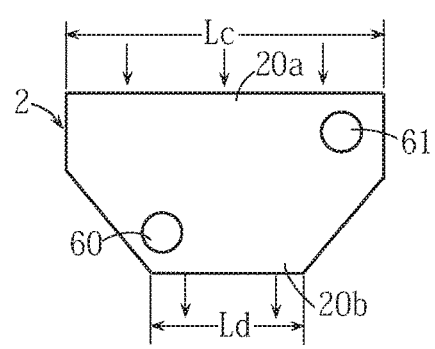

FIGS. 9A and 9B show examples of schematic shapes of the plate 2 in cases where the lower end portion 20b of the plate 2 has a shorter dimension than the upper end portion 20a. The plate may be formed in a pentagonal shape, a hexagonal shape, or the like, as shown in FIGS. 9A and 9B. As will become evident from the embodiments to be described below, the upper end portion and lower end portion of the plate may of course also be formed at identical lengths.

In an embodiment shown in FIG. 10, a plurality of gas flow passages 7 are formed by the plate 2. The gas flow passages 7 are formed between the step-press portions 62. Each gas flow passage 7 has a width that does not remain constant in each location so that a width Lf on the lower end portion 20b side (the gas outflow opening portion 7b side) of the plate 2 is narrower than a width Le on the upper end portion 20a side (the gas inflow opening portion 7a side). Likewise with this configuration, similarly to the plate heat exchanger HE described above, a reduction in the heat transfer coefficient between the combustion gas and the plate 2 can be suppressed, and as a result, the heat exchange efficiency can be improved.

FIG. 11A shows a similar structure to FIG. 4B, but the bonded portion 80 shown in the figure can be formed with a bent portion 28, as shown in FIGS. 11B and 11C, for example. According to this configuration, brazing can be executed more easily and appropriately, the strength thereof can be increased, and so on.

Figure 12:
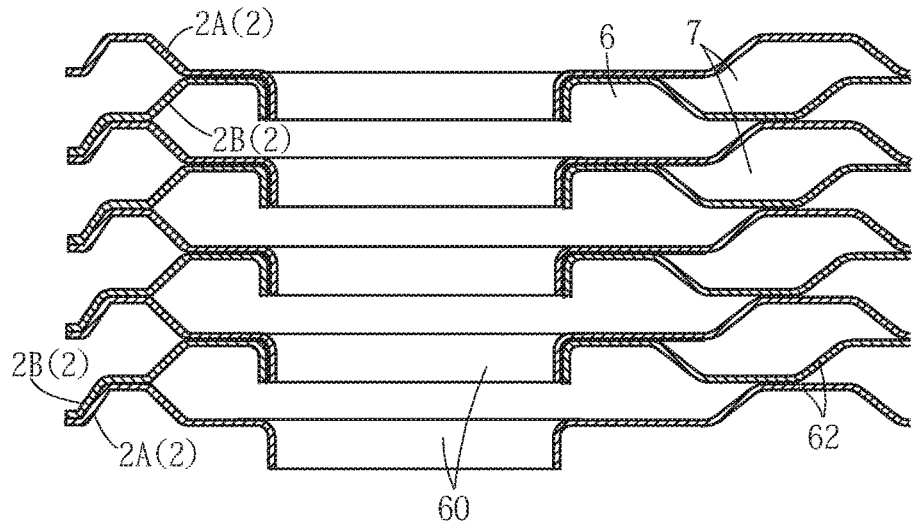
FIG. 12 is a sectional view showing main parts of another example of the present invention.

FIG. 12 differs from the structure shown in FIG. 11A in that a part corresponding to the bonded portion 80 is not provided on the outer peripheral edges of the first and second plates 2A, 2B. This configuration may also be employed in the present invention.

Figure 13:
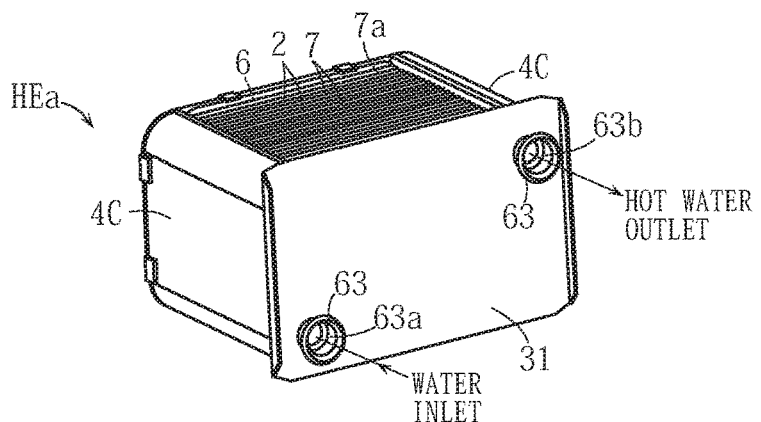
FIG. 13 is a schematic perspective view showing another example of the present invention.
Figure 14:
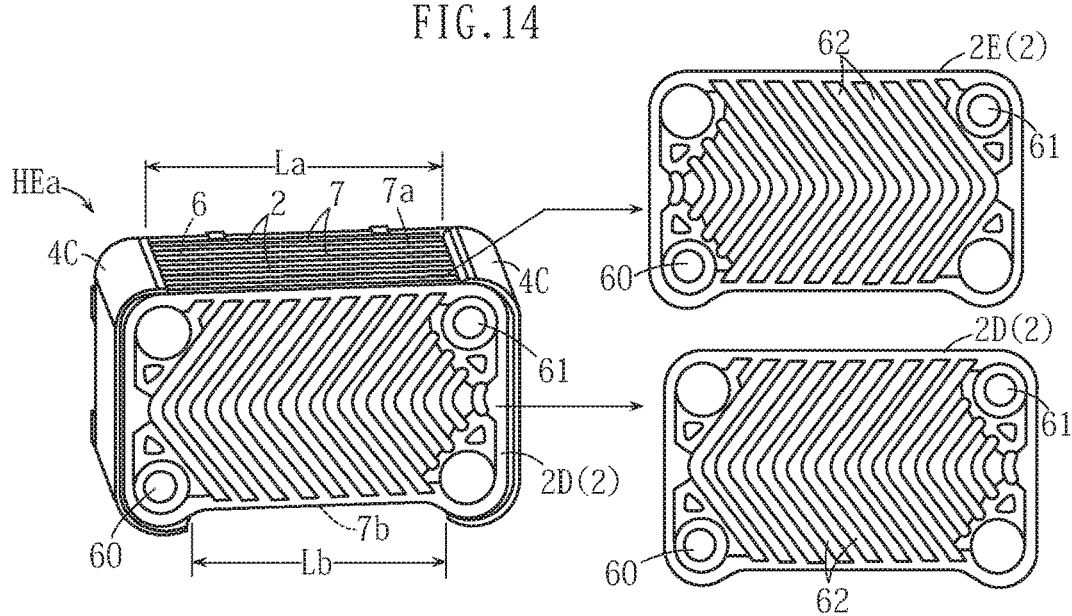
FIG. 14 is an exploded schematic perspective view of the heat exchanger shown in FIG. 13.

In a plate heat exchanger HEa shown in FIGS. 13 and 14, the plurality of plates 2 are substantially rectangular when seen from the front, and a left-right pair of flow-straightening members 4C are brazed to the vicinity of side face portions thereof. Two types of plates 2D, 2E shown in FIG. 14, for example, are used as the plates 2. In the flow-straightening members 4C, the respective widths La, Lb (the opening areas) of the gas inflow opening portion 7a and the gas outflow opening portion 7b of the gas flow passages 7 of the plurality of plates 2 are defined by a relationship of La>Lb. As is evident from this embodiment, the intended configurations of the present invention can also be realized by employing plates that are substantially rectangular when seen from the front and flow-straightening members.

Figure 15A:
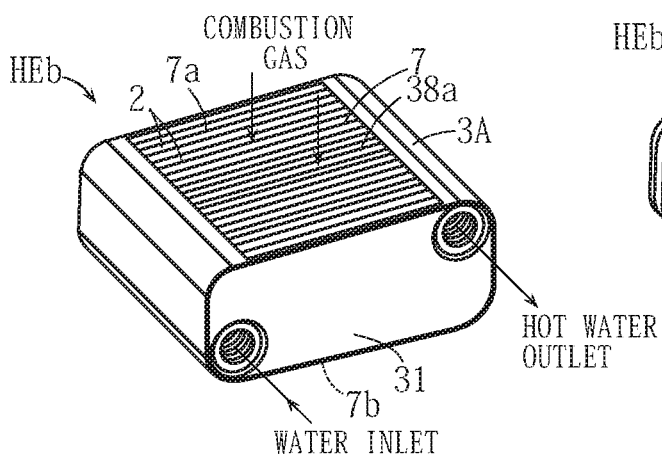
FIGS. 15A and 15B are schematic perspective views showing other examples of the present invention.
Figure 15B:
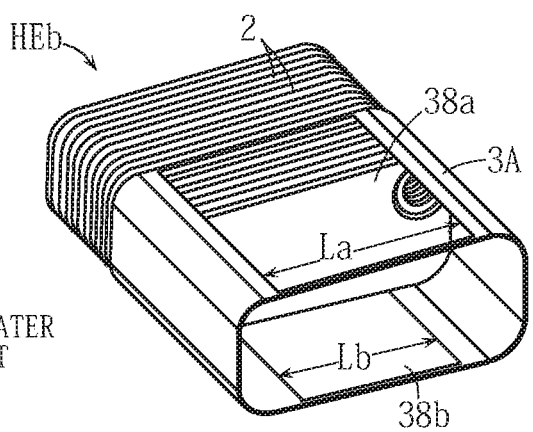

In a plate heat exchanger HEb shown in FIGS. 15A and 15B, the plurality of plates 2 are housed in a tubular case 3A that serves as a flow-straightening member and is provided with opening portions 38a, 38b respectively in an upper surface portion and a lower surface portion thereof. In a plate heat exchanger HEc shown in FIGS. 16A and 16B, the plurality of plates 2 are housed in a tubular case 3B that serves as a flow-straightening member and is provided with opening portions 38c, 38d respectively in left and right side face portions thereof.

Figure 16A:
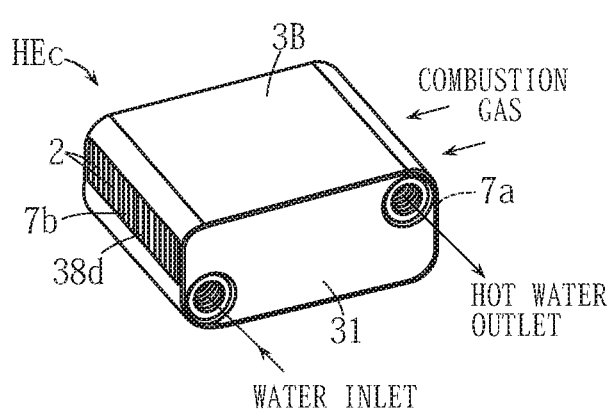
FIGS. 16A and 16B are schematic perspective views showing other examples of the present invention.
Figure 16B:
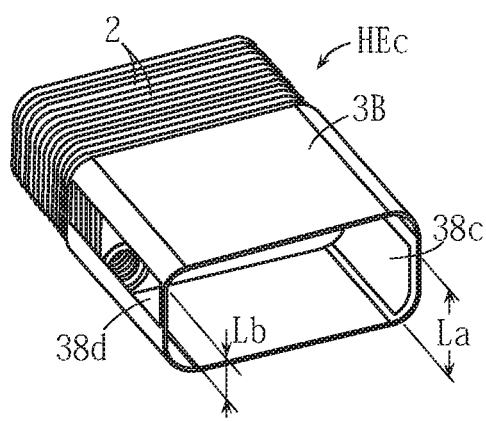

Combustion gas is supplied to the plate heat exchanger HEb shown in FIGS. 15A and 15B in an up-down direction, whereas combustion gas is supplied to the plate heat exchanger HEc shown in FIGS. 16A and 16B in a substantially horizontal direction. In both cases, the flow-straightening member is constituted by the single case 3A, 3B, and therefore the number of components can be reduced, making an assembly operation easier and so on.

The present invention is not limited to the content of the embodiments described above, and the specific configurations of the respective parts of the plate heat exchanger and the water heater comprising the plate heat exchanger according to the present invention may be freely subjected to various design modifications within the intended scope of the present invention.

The heating gas is not limited to combustion gas, and high-temperature exhaust gas or the like, for example, may be used instead. The liquid subjected to heating is not limited to water to be heated for use in a hot water supply. There are also no limitations on the specific shape, size, material, and so on of the plate.

The invention claimed is:

1. A plate heat exchanger comprising:
a plurality of plates stacked so that a liquid flow passage is formed on the inside thereof; and
a gas flow passage through which heating gas passes, the gas flow passage being formed between the plurality of plates and including a gas inflow opening portion and a gas outflow opening portion positioned on an opposite side to the gas inflow opening portion, wherein
the gas outflow opening portion has a smaller opening area than the gas inflow opening portion,
each of the plates has a smaller width on the gas outflow opening portion side than the gas inflow opening portion side,
each of the plates is provided in an upright attitude in an up-down height direction,
an inflow port of the liquid flow passage is provided in a lower portion of each of the plates adjacent to a first side end portion in a width direction, while an outflow port of the liquid flow passage is provided in an upper portion of each of the plates adjacent to a second side end portion, the second side end portion opposing the first side end portion in the width direction,
the first side end portion of each of the plates extends in an up-down height direction and is not inclined,
the second side end portion of each of the plates is inclined to a position where the second side end portion of each of the plates meets a lower end portion of each of the plates,
a first distance, in the width direction, between the position where the second side end portion of each of the plates meets the lower end portion of each of the plates and a center of the lower end portion of each of the plates is smaller than a second distance, in the width direction, between an outermost edge of the second side end portion of each of the plates and the center of the lower end portion of each of the plates, and
the first distance is smaller than a third distance, in the width direction, between the outflow port and the center of the lower end portion of each of the plates.

2. The plate heat exchanger according to claim 1, wherein an upper end portion of each of the plates is inclined so that the second side end portion has a greater height than the first side end portion.

3. The plate heat exchanger according to claim 1, wherein an upper end portion and the lower end portion of each of the plates are positioned respectively on an upstream side and a downstream side in a heating gas flow direction, and the liquid flow passage includes a first region that surrounds the inflow port and a first flow passage that extends linearly from the first region toward the upper end portion of the plate.

4. The plate heat exchanger according to claim 1, wherein the liquid flow passage includes a second region that surrounds the outflow port and a second flow passage that extends linearly from the second region toward the lower end portion of the plate.

5. The plate heat exchanger according to claim 1, wherein outer peripheral end portions of the plurality of plates opposing each other on opposite sides of the gas flow passage are bonded to each other except in regions of the gas inflow opening portion and the gas outflow opening portion.

6. The plate heat exchanger according to claim 1, wherein adjacent plates, among the plurality of plates, are brazed to each other, whereas regions near the center of plates that oppose each other on opposite sides of the gas flow passage are not brazed and therefore remain in a non-bonded state.

7. The plate heat exchanger according to claim 1, further comprising:
a flow-straightening member that covers a region of the outer periphery of the plurality of plates excluding the gas inflow opening portion and the gas outflow opening portion and prescribes respective opening widths of the gas inflow opening portion and the gas outflow opening portion.

8. The plate heat exchanger according to claim 1, wherein a plurality of gas flow passages are provided as the gas flow passage, and
the gas outflow opening portion of each of the gas flow passages has a narrower width than the gas inflow opening portion.

9. A water heater comprising:
the plate heat exchanger according to claim 1.

10. The water heater according to claim 9, further comprising:
an exhaust gas guide member that is connected to a downstream side of the plate heat exchanger in a heating gas flow direction in order to cause heating gas that has passed through the plate heat exchanger to flow in a first direction, a vector of the first direction intersects a vector of the heating gas flow direction through the plate heat exchanger, wherein
the plate heat exchanger is set so that a stacking direction of the plurality of plates corresponds to a second direction, and a vector of the second direction intersects the vector of the first direction.

* * * * *